US009623357B2

(12) United States Patent
Holzwarth et al.

(10) Patent No.: US 9,623,357 B2
(45) Date of Patent: *Apr. 18, 2017

(54) TANK VENT FILTER WITH DOWNPIPE

(71) Applicant: MANN+HUMMEL GMBH, Ludwigsburg (DE)

(72) Inventors: Marcel Holzwarth, Ludwigsburg (DE); Daniel Schmid, Sachsenheim (DE); Christian Vogt, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 183 days.

This patent is subject to a terminal disclaimer.

(21) Appl. No.: 14/547,680

(22) Filed: Nov. 19, 2014

(65) Prior Publication Data

US 2015/0144548 A1    May 28, 2015

(30) Foreign Application Priority Data

Nov. 20, 2013  (DE) .................. 10 2013 019 331

(51) Int. Cl.
*B01D 46/24* (2006.01)
*B60K 15/035* (2006.01)
*B01D 46/00* (2006.01)
*B60K 15/03* (2006.01)

(52) U.S. Cl.
CPC ..... *B01D 46/2403* (2013.01); *B01D 46/0023* (2013.01); *B01D 46/2411* (2013.01); *B60K 15/03504* (2013.01); *B01D 2279/35* (2013.01); *B60K 2015/03236* (2013.01); *B60K 2015/03509* (2013.01)

(58) Field of Classification Search
CPC ............ B01D 46/0023; B01D 46/0024; B01D 46/2403; B01D 46/2411; B01D 2279/35; B60K 15/03504; B60K 2015/03236; B60K 2015/03509
See application file for complete search history.

(56) References Cited

U.S. PATENT DOCUMENTS

| 2,603,308 | A | 7/1957 | Vertus |
| 6,183,526 | B1 * | 2/2001 | Suzuki ............... B01D 53/0415 55/311 |
| 2003/0145728 | A1 | 8/2003 | Fuhling |
| 2007/0175524 | A1 | 8/2007 | Gebert et al. |
| 2008/0011667 | A1 | 1/2008 | Ruschke |
| 2010/0224069 | A1 | 9/2010 | Donadei |

(Continued)

FOREIGN PATENT DOCUMENTS

EP          2607136 A1   6/2013
KR     20060021582 A    3/2006
(Continued)

*Primary Examiner* — Robert Clemente
(74) *Attorney, Agent, or Firm* — James Hasselbeck

(57) ABSTRACT

The invention relates to a tank vent filter (70) that guides tank contents that have inadvertently reached the tank vent filter (70) through a downpipe (80) past a first filter (78) of the tank vent filter (70). A contamination of the first filter (78) is thus prevented by means of a space-saving arrangement. The downpipe (80) and the first filter (78) are preferably arranged rotationally symmetrically around the longitudinal axis of the tank vent filter (70) in order to achieve an especially compact design of the tank vent filter (70).

10 Claims, 7 Drawing Sheets

(56) References Cited

U.S. PATENT DOCUMENTS

2011/0180466 A1     7/2011   Kalauch
2015/0135956 A1*    5/2015   Holzwarth ........... B60K 15/035
                                                         96/6

FOREIGN PATENT DOCUMENTS

WO     2005017340 A1    2/2005
WO     2013066217 A1    5/2013

* cited by examiner

TANK VENT FILTER WITH DOWNPIPE

CROSS-REFERENCE TO RELATED PATENT APPLICATIONS

This application claims the benefit of German Application No. 102013019331.1, filed Nov. 20, 2013, which is incorporated herein by reference in its entirety.

TECHNICAL FIELD

The invention relates to a tank vent filter, particularly for a motor vehicle.

BACKGROUND

It is known to use tank vent filters in order to clean the supply air flowing into the tank, particularly to dehumidify the air flowing into the tank and to filter particles out. Such tank vent filters are known, for example, from US 2007/0175524 A1, US 2010/0224069 A1 and US 2003/0145728 A1.

A tank vent filter is known from U.S. Pat. No. 2,603,308 that has, on its air outlet side, a chamber that is bordered by two plates with small through recesses in order to prevent contamination of a filter element in the tank vent filter as a result of fuel "sloshing" out of the tank.

Moreover, EP 2 607 136 A1 discloses a tank vent filter having a mechanically actuatable slosh protection device for preventing contamination of the tank vent filter with fuel.

Such a contamination of the tank vent filter with liquid stored in the tank is a concern particularly in mobile applications, for example in motor vehicles, and when the tank is full. The "sloshing-out" of the contents of the tank into the tank vent filter is referred to as so-called "backwash." The contamination of tank vent filters is particularly grave if the tank is filled at least partially with a urea solution.

To prevent such backwashing, KR 2006 0021582 A contains the teaching of providing a tank vent valve with a sphere that seals the outlet of the tank vent valve when the contents of the tank spill into the valve.

Furthermore, WO 2005/017340 A1 discloses a tank vent filter with a collecting space in the region of the air inlet, the collecting space being sealed with an adapter that opens automatically when a lot of the contents of the tank as collected in the collecting space.

Finally, a tank vent filter is known from WO 2013/066217 A1 that has a filter element that is protected by a cover from any fuel that might penetrate into the tank vent filter. However, such a cover occupies a relatively large amount of space.

SUMMARY OF THE DISCLOSURE

It is therefore the object of the invention to provide a tank vent filter that has a more compact design.

According to the invention, the tank vent filter is a tank vent filter that has at its lower end, along its filter longitudinal axis aligned or to be aligned vertically during operation, an air inlet and, at its upper end, an air outlet that can be connected to a tank, and a filter element with a first filter arranged fluidly between the air inlet and the air outlet, the air outlet leading at its lower end to a downpipe that is fluidly connected to the air inlet.

The tank vent filter can be mounted vertically, that is, so as to be aligned in the direction of its longitudinal axis, in or on a motor vehicle. The tank vent filter is therefore described in this mounting position using the positional terms "upper end, lower end, above, etc." Moreover, the term "tank vent filter" must not be understood such that the functionality of the tank vent filter is limited to tank ventilation. Rather, the tank vent filter also acts as a tank bleed filter, for example when a tank connected to the tank vent filter is being filled. For the sake of clarity, however, the terms "air inlet" and "air outlet" are described only in terms of the function as a tank vent filter, that is, when air is sucked into the tank, particularly when a motor vehicle is driven.

It is through the downpipe that the liquid contents of the tank are discharged via the air inlet without contaminating the filter element. The term "to lead to" is understood here as referring to a direct fluid connection. In other words: The tank contents flow directly out of the air outlet into the downpipe.

Preferably, the air outlet is embodied in the manner of a pipe or adapter.

In one variant, the air outlet adapter is embodied integrally with the downpipe. In another variant, however, the air outlet adapter and the downpipe are embodied as separate components.

Preferably, the air outlet adapter has a smaller diameter than the downpipe. In particular, one end of the air outlet adapter protrudes vertically or in the direction of the filter longitudinal axis into the downpipe, so that the adapter end is enclosed by the upper end of the downpipe. A gap is formed between the ends of the air outlet adapter and of the downpipe arranged inside each other through which the filtered air can flow from the first filter element to the tank.

An especially compact design of the tank vent filter is achieved by arranging the first filter indirectly or directly around the downpipe. The first filter is preferably embodied in the form of a star-shaped bellows in order to make a large surface area available. Preferably, the first filter is made of cellulose in order to enable effective particle filtration. Alternatively or in addition, the particle filter can be made of polymer fibers, a mixture of cellulose fibers and polymer fibers, and/or of a melt-blown medium. Especially preferably, the particle filter is made of a nanofiber medium.

A second filter can be arranged fluidly between downpipe and air inlet. The second filter prevents unfiltered air from reaching the air outlet through the downpipe.

The second filter is preferably embodied in the manner of a disc or mat in order to enable easy installation of the second filter into the tank vent filter.

The housing of the tank vent filter is preferably made of plastic. As a result, the tank vent filter can be produced in a cost-effective manner overall. Preferably, a plastic is used that is resistant to Diesel, gasoline and urea, so that the tank vent filter is not damaged by those substances—for example, when filling up the tank.

In a preferred embodiment of the invention, the second filter is injected into a holder made of plastic. As a result, the second filter is sealed in a structurally simple manner. The holder can particularly be a portion of the housing of the tank vent filter.

The second filter can be impermeable to liquids, such as fuels or lubricants and/or a urea solution. This prevents tank contents emerging from the tank into the downpipe, particularly fuel, from reaching the environment via the air inlet.

According to an especially preferred development of the invention, the second filter is permeable to liquids, i.e., to fuels or lubricants or to urea solutions, for example. As a result, liquid that has penetrated in retrograde fashion into the tank vent filter can be discharged downward/outward via the second filter. The tank bleed filter thus empties itself automatically.

According to the invention, the second filter can be air-permeable or even air impermeable. In the former case, filtering of the air flowing via the second filter into the downpipe is made possible. In that case, the flow resistance of the second filter is preferably greater than the flow resistance of the first filter. In this way, it can be ensured that the majority of the air flowing into the tank vent filter is conducted via the first filter and thereby filtered.

According to the invention, in order to achieve an especially high filtration rate, the second filter can be made of a textile, for example a fleece or a woven fabric, and particularly also of microfibers. With a view to imparting a high chemical resistance to the second filter, it is preferably made of a polyester material.

For the fluid connection between the interior space of the downpipe and the first filter, the downpipe can have at least one downpipe through recess embodied transverse to the longitudinal axis. The downpipe through recess enables quick evacuation of drawn-in air through the air outlet. Preferably, the downpipe has a plurality of such downpipe through recesses.

The downpipe through recess can be embodied by the interior space of the downpipe rising toward the first filter. As a result, liquid sprayed transverse to the longitudinal axis of the tank vent filter in the downpipe does not emerge from the downpipe. Preferably, the downpipe has a plurality of downpipe through recesses embodied by the interior space of the downpipe rising toward the first filter.

In a particularly preferred embodiment of the invention, the tank vent filter is characterized in that the downpipe is connected fluidly, particularly to a collecting space embodied below the downpipe. Tank contents reaching the tank vent filter are collected in the collecting space and discarded—when the tank vent filter is replaced, for example.

Preferably, the collecting space can be emptied through a valve, so that the tank contents reaching the tank vent filter can be regularly discharged from the tank vent filter.

The tank vent filter can be manufactured in an especially simple and cost-effective manner if the der tank vent filter is—with the exception of the connecting pieces—axially symmetrical to its longitudinal axis. The tank vent filter is particularly embodied in the region of the filter element axially symmetrically to its longitudinal axis.

In an especially preferred embodiment of the invention, a housing of the tank vent filter is—with the exception of the connecting pieces—rotationally symmetrical to its longitudinal axis. As a result, the tank vent filter can be produced in an especially cost-effective manner.

The tank vent filter according to the invention is preferably embodied so as to effectively dehumidify the air. A constriction can be provided over the air inlet of the tank vent filter for this purpose. The constriction effectively prevents water from penetrating into the interior space of the housing of the tank vent filter. The constriction can also be used to attach the tank vent filter to a motor vehicle. Since the opening cross-sectional surface of the tank vent filter is expanded above the constriction in comparison to the opening cross-sectional surface in the region of the constriction, the airflow flowing to the filter element is slowed in this region. In this way, an especially high water discharge rate and particle discharge rate is achieved above the constriction. In other words, as a result of the relatively large opening cross-sectional surface of the air inlet, the flow speed of the air is slowed to a minimum. The lower the flow speed of the air, the smaller the particle size up to which particle can follow the airflow into the tank vent filter. This is a consequence of the equilibrium of forces that is brought about by the vertically downwardly aligned weight force of the particle and the vertically upwardly aligned force on the particles as a result of the airflow. The critical diameter up to which particles follow the flow, i.e., are sucked, or up to which particles can no longer follow the flow, i.e., are no longer sucked, is referred to as the critical particle size. The tank vent filter according to the invention therefore has a very small critical particle size. Just like with the critical particle size, the maximum drop size of a drop of liquid, particularly a drop of water, up to which they are still sucked by the airflow is very small.

According to the invention, the opening cross-sectional surface of the constriction can have less than 40%, particularly less than 30%, preferably less than 20%, especially preferably less than 10% of the opening cross-sectional surface of the air inlet. The filter element of the tank vent filter can thereby be protected especially effectively from penetration of water and particles.

When seen fluidly, a multiply angled air guide can be provided between the constriction and the filter element. The air guide can be embodied in the form of a labyrinth. The air guide can have several plates, projections, ribs and/or recesses in order to guide the airflow over as long a path as possible to the filter element. In the air guide, the water and the particles are deposited through the influence of gravity.

A vertically aligned sedimentation chamber can be provided fluidly in the tank vent filter between the constriction and the filter element. In the sedimentation chamber, water and particles contained in the air flowing into the tank vent filter are deposited through the effect of gravity. Preferably, the air guide is arranged or embodied in the sedimentation chamber.

The first filter of the filter element is preferably accommodated between an upper-side end disc and a lower-side end disc of the filter element. In an especially preferred embodiment of the invention, the lower end disc constitutes the lower limit of the sedimentation chamber.

The air guide can have at least one water through recess provided in a bottom region of the air guide. Preferably, the air guide has several water through recesses in the bottom region. In this case, water deposited in the tank vent filter is simply guided through the water through recess(es) and further through the air inlet out of the tank vent filter.

The air guide can have at least one air through access provided in a top region of the air guide. Preferably, the top region of the air guide has several air through recesses. Rising air thus passes through the air through recess(es) to the filter element. At the same time, water passes through the water through recess(es) out of the tank vent filter.

In an especially preferred embodiment of the invention, the at least one air through recess has a larger opening cross-sectional surface than the at least one water through recess. Preferably, all air through recesses have a larger opening cross-sectional surface than the water through recesses. By virtue of the larger opening cross section(s) of the air through recess(es), the path of the airflow from the constriction to the filter element via the water through recess(es) is prevented from being shortened.

The invention further relates to a filter element for a previously described tank vent filter.

BRIEF DESCRIPTION OF DRAWINGS

Additional features and advantages of the invention follow from the following detailed description of several sample embodiments of the invention, from the figures of the drawing, which show details that are essential to the invention, and from the claims.

The features depicted in the drawing are represented so as to make the particularities according to the invention clearly visible. The various features can be implemented individually by themselves or in any combination in variants of the invention.

DETAILED DESCRIPTION

Figure 1:
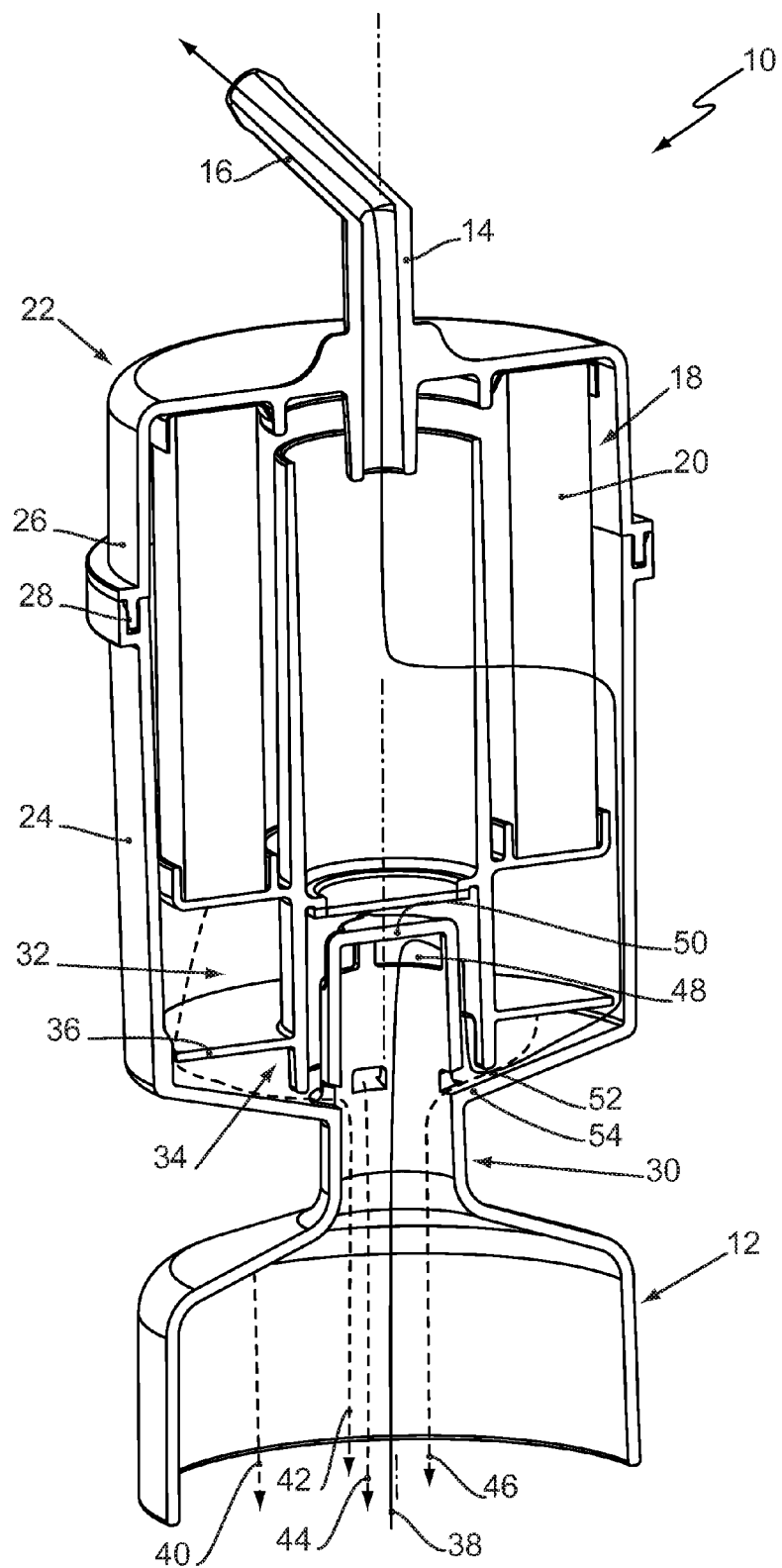
FIG. 1 shows a cutaway perspective view of a first tank vent filter.

FIG. 1 shows a first tank vent filter 10. The tank vent filter 10 is used to vent and bleed a tank (not shown). The tank vent filter 10 has an air inlet 12 and an air outlet 14. The air outlet 14 can be connected to the tank via a connection piece 16. The air outlet 14 is used to attach the tank vent filter 10 to a motor vehicle.

The tank vent filter 10 has a filter element 18 with a first filter 20. The first filter 20 has a star-shaped folded filter material for filtering particles. As a result, the tank contents are kept free of dirt that would otherwise be sucked into the tank as the level of the tank contents drops.

The tank vent filter 10 has a housing 22 with a lower housing half 24 and an upper housing half 26. The two housing halves 24, 26 are connected to each other at a radial joint 28, for example by a friction-welded seam. The first tank vent filter 10 can thus be produced in an especially cost-effective manner.

The air inlet 12 is embodied in the lower housing half 24. The lower housing half 24 has a constriction 30 above the air inlet 12. The constriction 30 is used to receive a clamp (not shown) for attaching the first tank vent filter 10 to the motor vehicle. First and foremost, however, the constriction 30 serves to separate out water penetrating in via the air inlet 12. Particularly snow, hail, water spray and the like are impeded by the constriction 30 from penetrating farther into the first tank vent filter 10.

Above the constriction 30, the first tank vent filter 10, particularly the lower housing half 24 of the first tank vent filter 10, has a sedimentation chamber 32. The sedimentation chamber 32 is used for the further gravitational separation of water and particles. The opening cross-sectional surface, that is, the surface of the opening transverse to the longitudinal axis of the first tank vent filter 10, of the sedimentation chamber 32 is substantially larger than the opening cross-sectional surface of the constriction 30. The airflow entering from the constriction 30 into the sedimentation chamber 32 is thereby slowed.

A multiply angled air guide 34 is provided in the sedimentation chamber 32. The air guide 34 has a first plate 36 and several projections (not provided with reference symbols for the sake of clarity) in order to lengthen the path of the air between the constriction 30 and the filter element 18. Through the lengthening of the path of the air, a higher water deposition rate and particle deposition rate is achieved. As a result, both the filter element 18 and ultimately the tank contents as well are protected from moisture.

FIG. 1 shows a path of the air from the air inlet 12 to the connection piece 16, depicted for the sake of example by a solid arrow 38. Arrows 40-46 drawn with broken lines show a sample path of the water from the air inlet 12 deposited in the first tank vent filter 10.

It can be seen from FIG. 1 that the air guide 34 of the first tank vent filter 10 has several air through recesses, only the first air through recess 48 of which is provided with a reference symbol for the sake of clarity. The air through recesses, for example the first air through recess 48, are embodied in a top region 50 of the air guide 34. The air guide 34 also has several water through recesses, of which only a first water through recess 52 is provided with a reference symbol for the sake of clarity. The water through recesses, for example the first water through recess 52, are embodied in a bottom region 54 of the air guide 34. As a result, the water deposited in the sedimentation chamber 32 flows without barriers into the constriction 30 and and ultimately into the air inlet 12. The opening cross-sectional surface of the air through recesses, for example of the first air through recess 48, is greater than the opening cross-sectional surface of the water through recesses, for example of the first water through recess 52. As a result, the airflow is prevented for the most part from taking a "shortcut" through the water through recesses, for example the first water through recess 52, instead taking the longer path via the air through recesses, for example the first air through recess 48.

Figure 2:
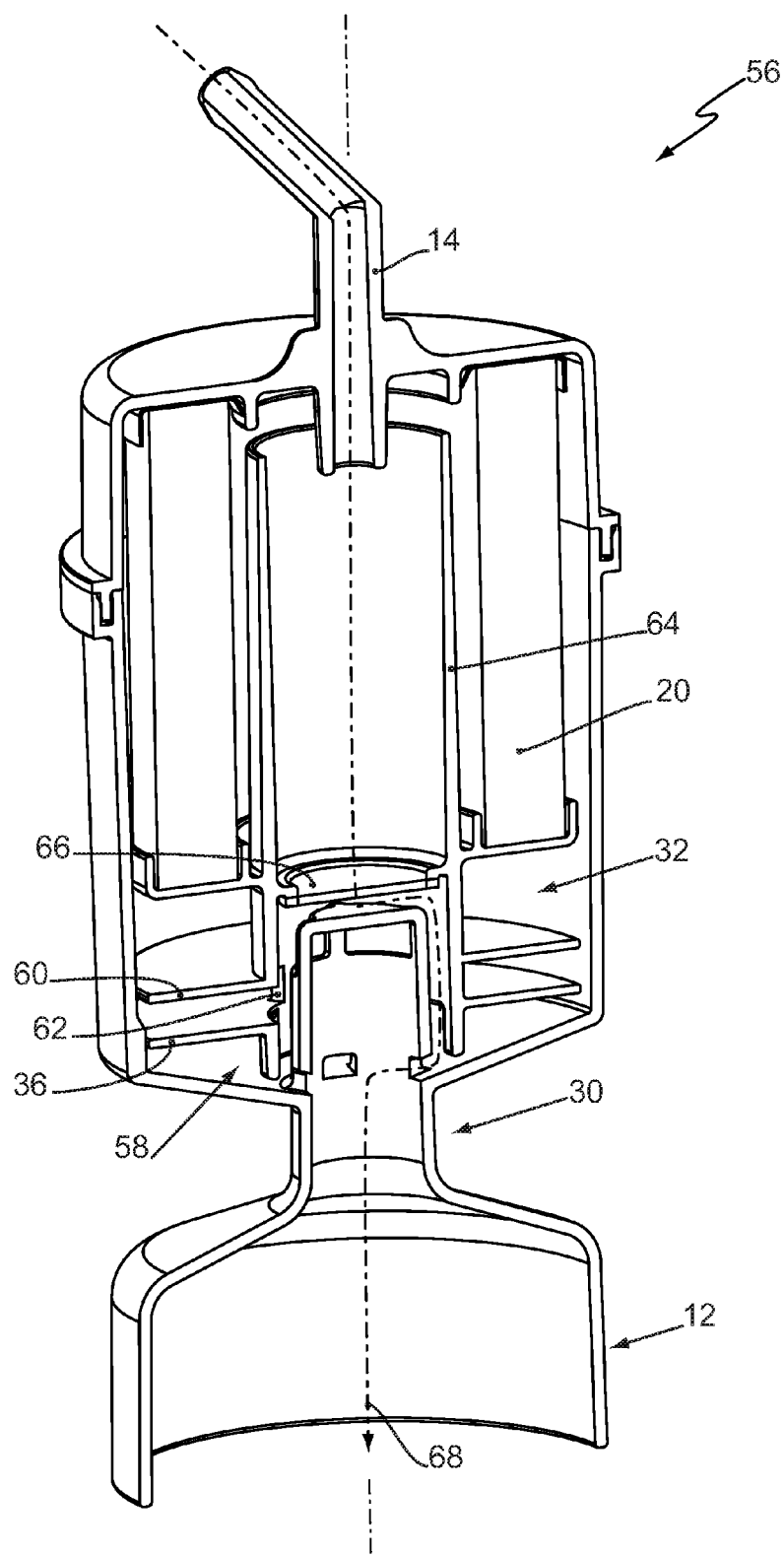
FIG. 2 shows a cutaway perspective view of a second tank vent filter.

FIG. 2 shows a second tank vent filter 56. With the exception of one air guide 58, the second tank vent filter 56 corresponds to the first tank vent filter 10 according to FIG. 1. Same features of the tank vent filter 10, 56 are therefore provided with the same reference symbols.

The air guide 58 has the first plate 36, a second plate 60 and a rib through recess 62 embodied above the first plate 36. By means of the rib through recess 62, deposited water flows down between the plates 36, 60 into the constriction 30. The additional second plate 60 enlarges the surface of the sedimentation chamber 32 on which air flows, thereby increasing the water deposition rate and the particle deposition rate.

Particularly in mobile applications of the tank vent filter, a "sloshing" of the tank content, particularly of fuel and/or a urea solution, into the second tank vent filter 56 can occur. This would result in the damaging of the first filter 20. However, the second tank vent filter 56 is (like the tank vent filter described previously in connection with FIG. 1 as well) protected against such a contamination of the first filter 20 by the tank contents—as described below.

The air outlet 14 leads to a downpipe 64. The downpipe 64 and [sic] is fluidly connected to the sedimentation chamber 32 via a second filter 66. The second filter 66 is permeable to liquids, such as fuels or lubricants, for example, or a urea solution, in order to enable the tank contents to flow down from the downpipe 64 into the sedimentation chamber 32 and finally into the air inlet 12. A dashed and dotted arrow 68 shows a sample path of the fuel contents through the second tank vent filter 56. The second air filter 66 is air-permeable to a small extent and has such a high flow resistance for air that the air flowing into the tank vent filter 56 is guided primarily via the first filter 20.

Figure 3:
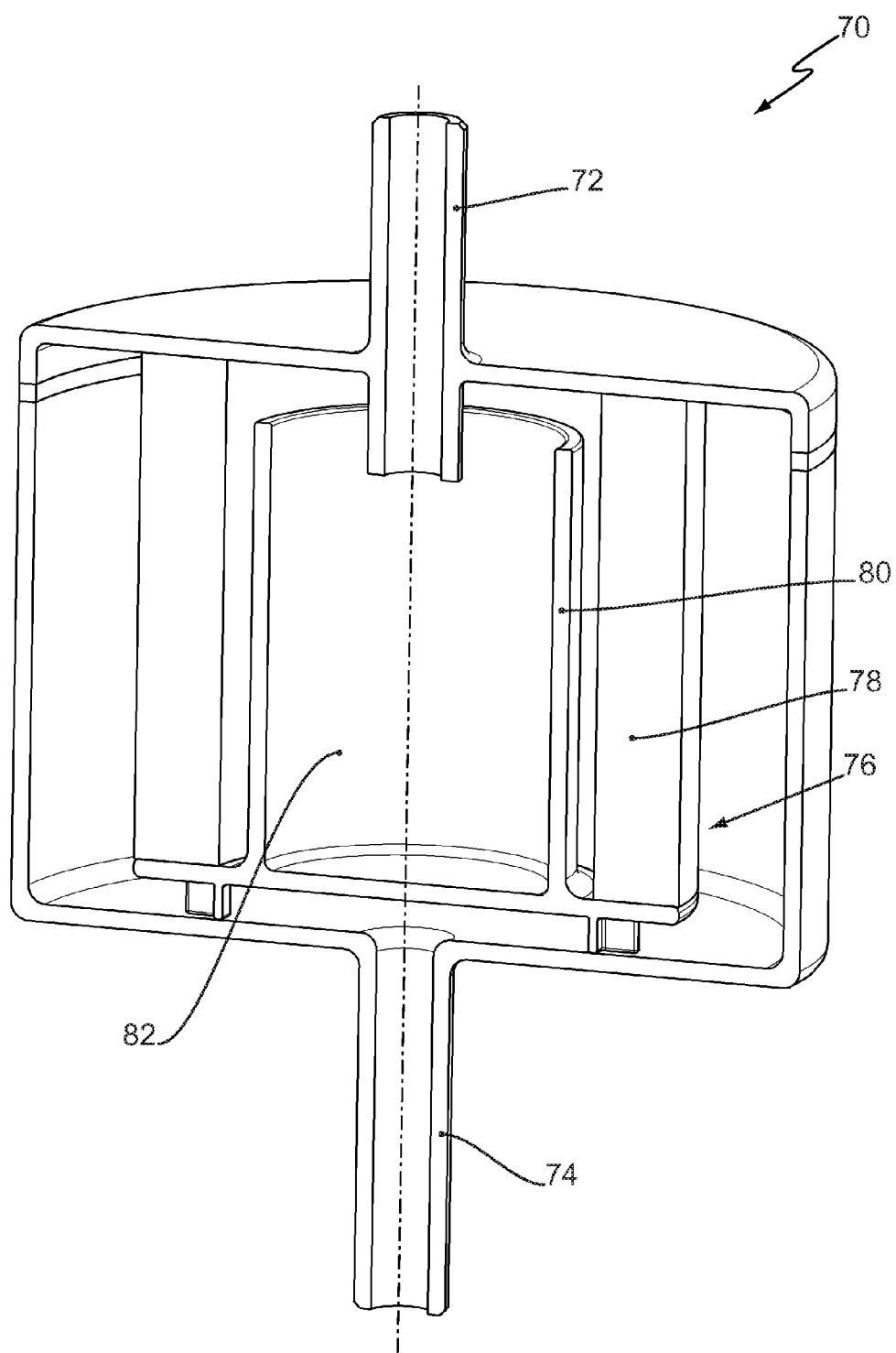
FIG. 3 shows a cutaway perspective view of a third tank vent filter.

FIG. 3 shows a third tank vent filter 70 with an air inlet 72, an air outlet 74, a filter element 76 arranged fluidly therebetween with a first filter 78 and a downpipe 80 embodied on the filter element 76. The air outlet 72 leads at its lower end into the downpipe 80. The downpipe 80 is fluidly connected via the first filter 78 to the air inlet 74. The downpipe 80 is connected fluidly to a collecting space 82. In the present case, the downpipe 80 is embodied integrally with the collecting space 82.

Figure 4:
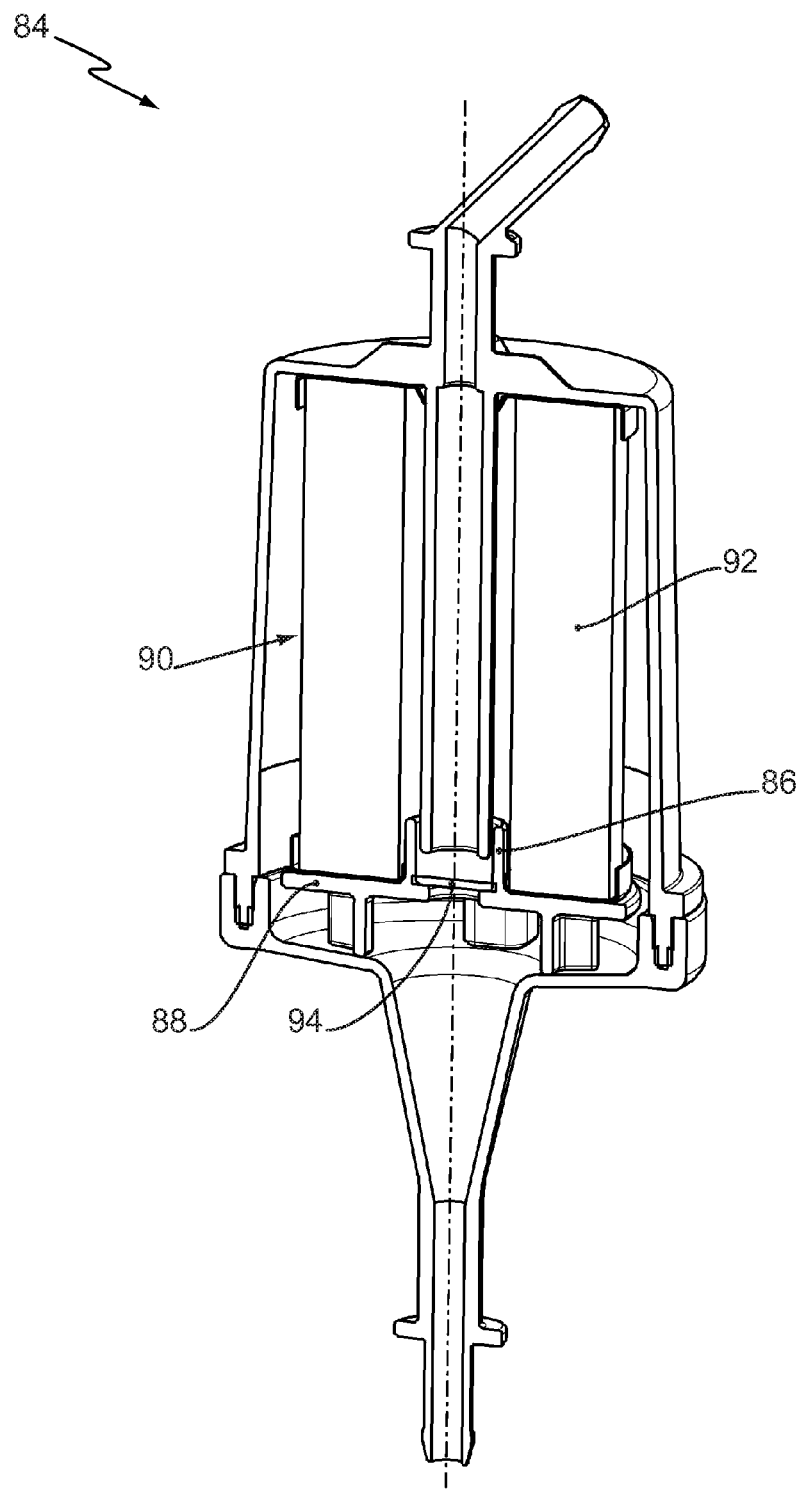
FIG. 4 shows a cutaway perspective view of a fourth tank vent filter.

FIG. 4 shows a fourth tank vent filter 84. The fourth tank vent filter 84 has a relatively short downpipe 86. The downpipe 86 is embodied integrally with a plastic end plate 88 of a filter element 90. The filter element 90 has a first filter 92 and a second filter 94. The second filter 94 is made of a polyester woven fabric. The second filter 94 is injected into the end plate 88.

Figure 5:
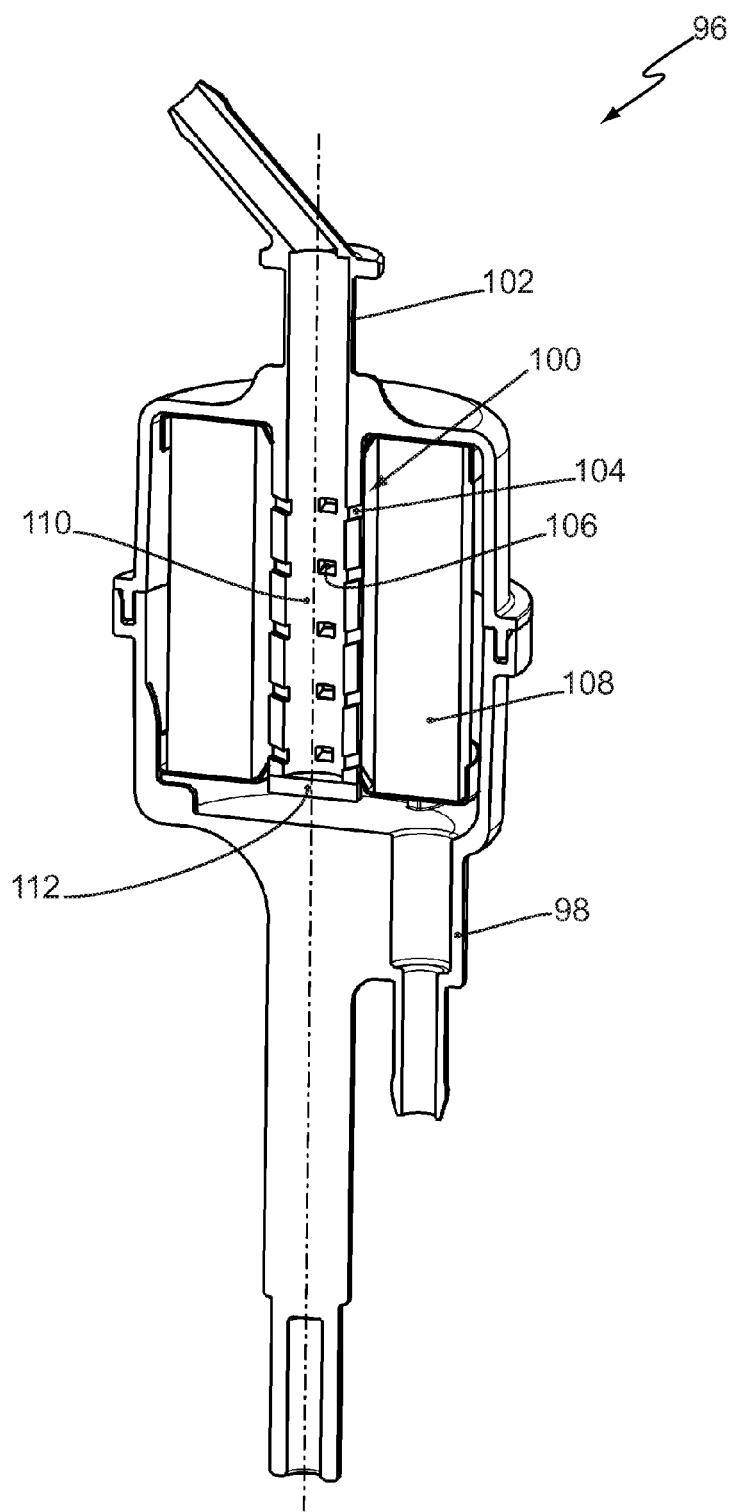
FIG. 5 shows a cutaway perspective view of a fifth tank vent filter.

FIG. 5 shows a fifth tank vent filter 96. The fifth tank vent filter 96 has an air inlet 98 offset parallel to the longitudinal axis of the fifth tank vent filter 96. A downpipe 100 is embodied integrally with an air outlet 102 of the fifth tank vent filter 96. The downpipe 100 has a plurality of downpipe through recesses, of which only the first downpipe through recess 104 and a second downpipe through recess 106 are provided with reference symbols in FIG. 5 for the sake of clarity. The downpipe through recesses 104, 106 fluidly connect the downpipe via a first filter 108 to the air inlet 98. The downpipe through recesses 104, 106 are embodied by the interior space 110 of the downpipe 100 rising toward the first filter 108. As a result, tank contents moving transverse to the longitudinal axis of the downpipe 100 do not inadvertently reach the first filter 108. The downpipe 100 is closed at its lower end by a second filter 112.

Figure 6:
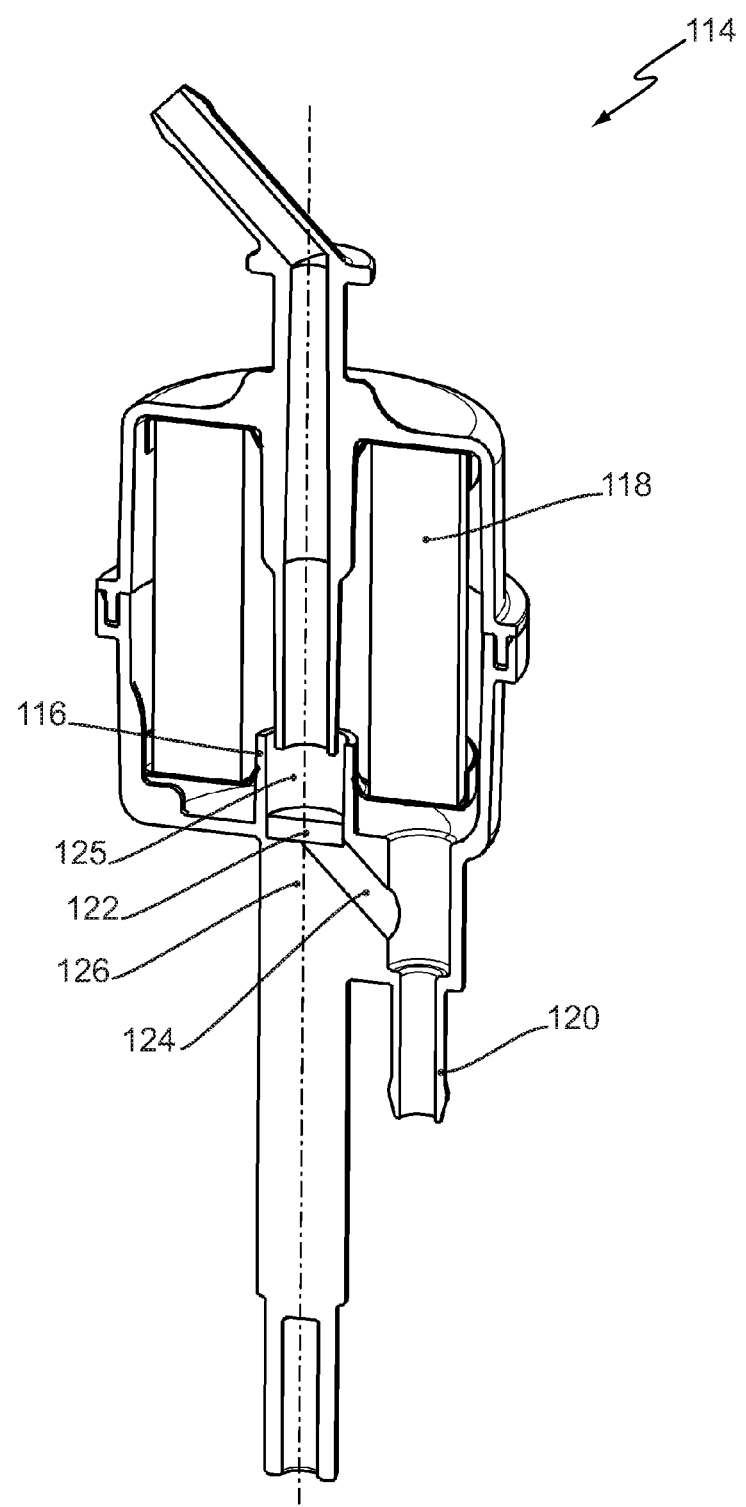
FIG. 6 shows a cutaway perspective view of a sixth tank vent filter.

FIG. 6 shows a sixth tank vent filter 114. The sixth tank vent filter 114 has a downpipe 116 that is fluidly connected via a first filter 118 to an air inlet 120 and fluidly connected via a second filter 122 to the air inlet 120. The fluid connection between the second filter 122 and the air inlet 120 occurs via a branch through recess 124. A valve (not shown) can be provided in the region of the branch through recess 124 in order to fluidly close or open the branch through recess 124. It is possible to discharge through the valve, in a controlled manner, tank contents that have accumulated in a collecting space 125 with the valve closed.

In a region 126 below the second filter 122, a collecting space (not shown) can also be provided that is fluidly connected to the downpipe 116. Tank contents are collected in this collecting space. In this case, the second filter 122 can be omitted.

Figure 7:
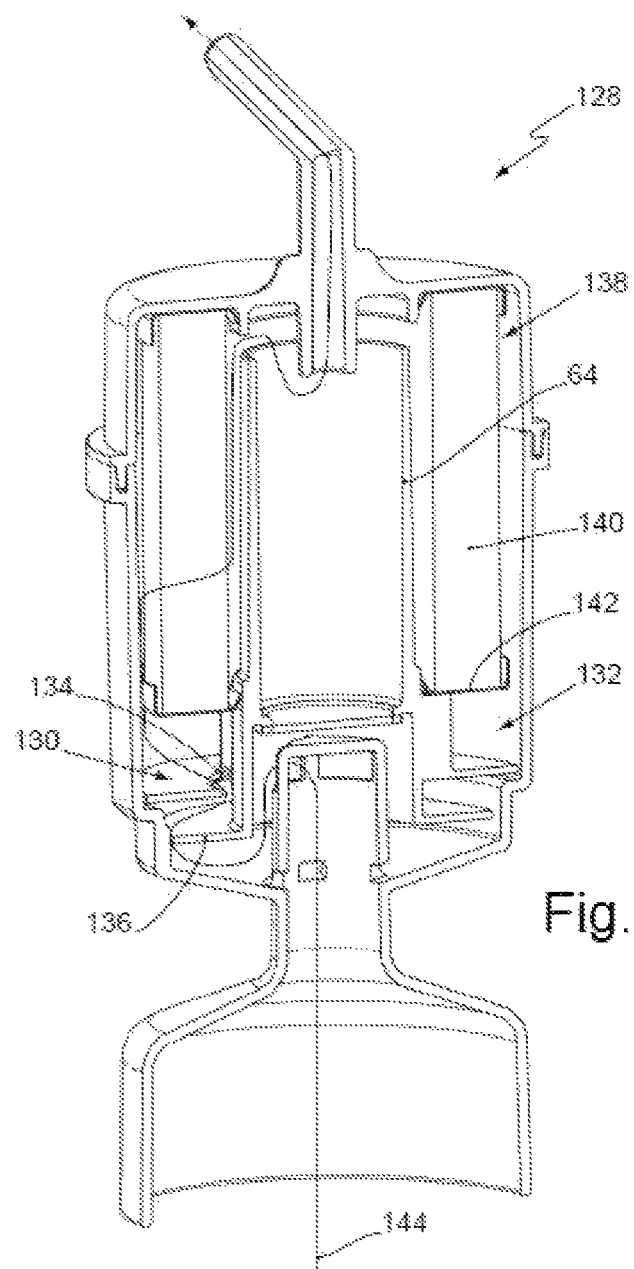
FIG. 7 shows a cutaway perspective view of a seventh tank vent filter.

FIG. 7 shows a seventh tank vent filter 128. The third tank vent filter 128 is identical to the second tank vent filter 56 (see FIG. 2). However, a first plate 130 of an air guide 132 has an axially internal through hole 134. In contrast, a second plate 136 is embodied without an axial through hole. Consequently, the air must travel over an especially long path in the air guide 132.

In addition, a first filter element 138, unlike the second tank vent filter 56, has a first filter 140 that forms a tight seal on the bottom side toward the downpipe 64 through an end disc 142 made of metal.

An arrow 144 shows a sample path of the air through the third tank vent filter 128.

In summary, the invention relates to a tank vent filter that guides tank contents that have inadvertently reached the tank vent filter through a downpipe past a first filter of the tank vent filter. A contamination of the first filter is thus prevented by means of a space-saving arrangement. The downpipe and the first filter are preferably arranged rotationally symmetrically around the longitudinal axis of the tank vent filter in order to achieve an especially compact design of the tank vent filter.

What is claimed is:

1. A tank vent filter comprising:
   an air inlet arranged along a vertically aligned filter longitudinal axis on a lower end of the tank vent filter;
   an air outlet arranged on an upper end of the tank vent filter, the air outlet connectable to a tank;
   a filter element having a first filter arranged between the air inlet and the air outlet;
   wherein the air outlet leads on its lower end to a downpipe that is fluidly connected to the air inlet,
   a second filter arranged fluidly between the downpipe and the air inlet.

2. The tank vent filter as set forth in claim 1, wherein the first filter is arranged indirectly or directly encircling around the downpipe.

3. The tank vent filter as set forth in claim 1, wherein the second filter is fuel-permeable and/or permeable for urea solutions.

4. The tank vent filter as set forth in claim 1, wherein the second filter is air-permeable and has a greater flow resistance for air in comparison to the first filter.

5. A tank vent filter comprising:
   an air inlet arranged along a vertically aligned filter longitudinal axis on a lower end of the tank vent filter;
   an air outlet arranged on an upper end of the tank vent filter, the air outlet connectable to a tank;
   a filter element having a first filter arranged between the air inlet and the air outlet;
   wherein the air outlet leads on its lower end to a downpipe that is fluidly connected to the air inlet,
   wherein the downpipe has at least one downpipe through recess embodied transverse to the longitudinal axis between interior space of the downpipe and the first filter.

6. The tank vent filter as set forth in claim 5, wherein the downpipe through recess extends through a wall of the downpipe, extending between and fluidically connecting the interior space of the downpipe and the first filter.

7. The tank vent filter as set forth in claim 5, wherein the downpipe is fluidly connected to a collecting space.

8. The tank vent filter as set forth in claim 7, wherein the collecting space is adapted to be drainable through a valve.

9. The tank vent filter as set forth in claim 8, wherein the tank vent filter is substantially axially symmetrical to its longitudinal axis.

10. The tank vent filter as set forth in claim 5, wherein the first filter is arranged indirectly or directly encircling around the downpipe.

* * * * *